Figure 1:
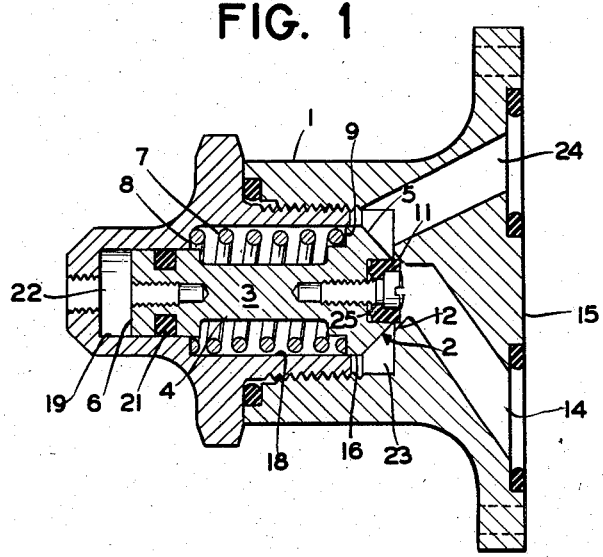

Feb. 24, 1959 J. J. KELLY 2,874,718
HYDRAULIC FUEL SHUT-OFF VALVE
Filed Sept. 23, 1954

INVENTOR.
JACK J. KELLY
BY
ATTORNEY

# United States Patent Office 2,874,718
Patented Feb. 24, 1959

2,874,718

HYDRAULIC FUEL SHUT-OFF VALVE

Jack J. Kelly, Waldwick, N. J., assignor to Bendix Aviation Corporation, Teterboro, N. J., a corporation of Delaware Application September 23, 1954, Serial No. 457,810

1 Claim. (Cl. 137—469)

This invention pertains to a novel and improved hydraulic fuel shut-off valve. The valve is characterized by its small size and light weight and by other features which make it desirable for use with devices, such as aircraft fuel feed lines, where space, weight and the nature of the fuel flow are decisive matters. Though the valve finds this particular use, it is subject to a wide variety of other applications.

The device is of a type wherein the valve is spring biased to closed position. It is, however, of such a structure that a relatively greater fuel pressure is required to open the valve than is required to hold it open. In operation, the valve provides a fuel flow having a negligible pressure drop from inlet to outlet. The valve further evidences sharp shut-off characteristics in closing when the fuel feed pressure falls below the pressure required to hold the valve open.

An object of the invention is, therefore, a novel and improved hydraulic fuel shut-off valve, that is efficient in operation, small in size, and light in weight.

Another object of the invention is to provide a hydraulic fuel shut-off valve wherein the pressure required to open the valve is relatively greater than that required to hold it open, and wherein the fuel flow from inlet to outlet is practically without pressure drop.

A still further and more particular object of the invention is to provide a hydraulic fuel shut-off valve that is particularly suited for use in the fuel feed line of combustion engines of jet aircraft.

The foregoing and other objects and advantages of the invention will appear more fully hereinafter from a consideration of the detailed description, which follows, taken together with the accompanying drawings wherein an embodiment of the invention is illustrated. It is to be expressly understood, however, that the drawings are for purposes of illustration and description, and are not to be construed as defining the limits of the invention.

Figure 2:
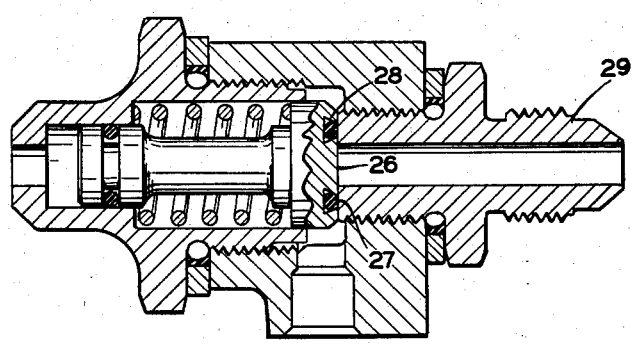

In the drawings:

Fig. 1 is a longitudinal cross section through a hydraulic fuel shut-off valve embodying the invention; and Fig. 2 is a similar section of a further embodiment of the invention.

In describing the invention in further detail, reference is directed to the drawings, now particularly Fig. 1, where there is shown a shut-off valve structure of small and compact size. It includes a housing 1 in which is axially disposed valve mechanism 2. The latter includes a piston valve member 3 having a shaft portion 4. The latter terminates at one end in a truncated conical valve head 5 of relatively larger diameter, and terminates at its opposite end in a cylindrical plunger 6 of reduced diameter. A coil spring 7 about shaft 4 limits at one end against a housing shoulder 8, and at the other end limits against a shoulder 9 provided by valve head 5. Coil spring 7 constantly urges the valve head to bring its truncated end 11 to seating position on a conical seat 12. The latter is provided about an axial opening representing the terminal end of an inlet port 14 that enters through an end wall 15 of the housing.

Valve member 3 is supported and guided in its axial movement to and from the valve seat by a short cylindrical portion 16 of the valve head, which cylindrical portion is adapted to move in contact with the cylindrical wall of a chamber 18. It is further guided and supported in its axial movement by the plunger end 6 thereof which is adapted to move in contact with the cylindrical wall of a reduced continuation 19 of chamber 18. The plunger is sealed at 21 against any possible leakage past the plunger; the space 22 to the rear of the plunger is vented to the atmosphere, whereby the development of any pressure block at this end of the valve member is avoided.

Chamber 18 opens out into a chamber space 23 of larger diameter. Exiting from chamber 23 through the housing to the outside is an outlet port 24. The outlet port is adapted for connection with a feed line to an associated engine for starting combustion.

The truncated end of the valve head 5 provides a cylindrical axial recess in which is carried a plug or washer 25 of suitable valve sealing material, such as nylon plastic, or the like. Plug 25 projects slightly out of the recess and is adapted to seat on the conical seat 12 over the inlet port.

In the operation of the valve, fuel for starting combustion in an associated engine is fed through the inlet port. When the pressure of the fuel is sufficient to force the valve head from its seat against the tension of the coil spring, the fuel enters the enlarged chamber space 23 and from there exits through the outlet port to a combustion chamber of an associated engine. It is to be noted that the entering fuel first attacks the truncated end 11 of the valve head, which represents only a small area of the valve head. After the valve head has been moved from its seat, the fuel enters the chamber space 23 and attacks the valve over a greater area. It is clear then, that a relatively greater fuel pressure will be required to open the valve than will be required to subsequently hold it open. This results in a relatively small or negligible pressure drop across the valve during its operation. This pressure drop is further minimized by the close proximity as shown of the inlet and outlet ports from the chamber 23 and by a suitable depth of the latter, whereby the flow from inlet to outlet is substantially direct with a minimum of resistance. It is also to be noted that the inlet ports and outlet ports are of similar diameters, whereby the flow from inlet to outlet is full and free of turbulence. The valve automatically shuts off under tension of the coil spring when the fuel pressure falls below the minimum required to overcome the bias of the coil spring.

It is clear that the valve head may be formed otherwise than as shown in Fig. 1. It may be cylindrical with a flat seating face 26 as in Fig. 2. In the form of the valve head shown in Fig. 2, an O-seal ring 27 is carried in a recess 28 in the face of the valve and is adapted to seat against the slightly intruding end wall of an axial inlet fitting 29, carried in the end wall of the housing. This provides for sharp shut-off characteristics, in that the cooperating walls of the seat and valve face are parallel to one another and a wide seating surface is provided.

The valve structure embodying the invention is particularly characterized by its small size and light weight. The valves disclosed weigh approximately 3 ounces and provide a proper capacity flow. The small size and light weight of the valve, together with the characteristics pointed out above, make it particularly suited for use as a shut-off valve in association with the fuel line of jet engines and the like.

While the invention has been shown and illustrated as above, it is to be expressly understood that the invention is not limited thereto. Various changes can be made in the design and arrangement of the parts without departing from the spirit and scope of the invention as the same will now be understood by those skilled in the art.

I claim:

A shut-off valve comprised of a housing having in axial alignment an inlet opening, a cylindrical outlet chamber, a cylindrical valve head chamber adjacent said inlet opening and a piston guide cylindrical chamber; said outlet chamber, said valve head chamber and said guide chamber having progressively smaller diameters; the diameter of said inlet opening being about one-half that of said outlet chamber; a peripheral outlet passage in said housing which extends from said outlet chamber and has the same diameter as said inlet opening; a valve member having a cylindrical guide piston, a shank and a valve head which has an annular valve element; a flat transverse annular valve seat surrounding said inlet opening; said annular valve element being an O-ring arranged to contact said annular valve seat; said guide piston and said valve head respectively being slidably positioned in said guide chamber and said valve head chamber; a coil spring surrounding said shank and contacting the inner end of said valve head chamber and the inner face of said valve head so that said valve element normally contacts said annular valve seat; said guide piston having an O-ring seal in the periphery thereof which contacts the wall of said guide chamber; an axial vent from said guide chamber for continually venting said guide chamber to the atmosphere, said housing being comprised of a first sub-housing providing said guide chamber and said valve head chamber; a second sub-housing threaded on said first sub-housing and providing said outlet passage and said outlet chamber; and an inlet fitting threaded into said second sub-housing and providing said inlet opening and said annular valve seat.

References Cited in the file of this patent
UNITED STATES PATENTS

| | | |
|---|---|---|
| 156,371 | Orr | Oct. 27, 1874 |
| 509,351 | Maertens | Nov. 21, 1893 |
| 2,417,494 | Hoof | Mar. 18, 1947 |
| 2,448,429 | Henry | Aug. 31, 1948 |
| 2,541,395 | Wilson | Feb. 13, 1951 |
| 2,568,026 | Pigott | Sept. 18, 1951 |
| 2,628,633 | Folmsbee | Feb. 17, 1953 |

FOREIGN PATENTS

| | | |
|---|---|---|
| 22,075 | Great Britain | Oct. 13, 1903 |
| 121,570 | Great Britain | Dec. 24, 1918 |
| 104,668 | Sweden | June 2, 1942 |
| 867,190 | Germany | Feb. 16, 1953 |